(12) United States Patent
Luo et al.

(10) Patent No.: US 10,866,658 B2
(45) Date of Patent: Dec. 15, 2020

(54) INDICATOR DEVICE, MIXED REALITY DEVICE AND OPERATION METHOD THEREOF

(71) Applicant: Industrial Technology Research Institute, Hsinchu (TW)

(72) Inventors: Shih-Bin Luo, Xinpu Township (TW); Chun-Chuan Lin, Hsinchu (TW); Wen-Hung Cheng, Taoyuan (TW); Ming-Che Wang, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/226,845

(22) Filed: Dec. 20, 2018

(65) Prior Publication Data
US 2020/0201452 A1 Jun. 25, 2020

(51) Int. Cl.
*G06F 3/038* (2013.01)
*G06F 3/0346* (2013.01)
*G06F 3/03* (2006.01)

(52) U.S. Cl.
CPC .......... *G06F 3/0383* (2013.01); *G06F 3/0304* (2013.01); *G06F 3/0346* (2013.01)

(58) Field of Classification Search
CPC ........ A63F 13/06; A63F 13/10; A63F 13/213; A63F 13/24; A63F 13/42;
(Continued)

(56) References Cited

U.S. PATENT DOCUMENTS

| 6,538,645 | B1* | 3/2003 | Juang | .................. G06F 3/03545 178/18.01 |
| 8,229,167 | B2 | 7/2012 | Lee et al. | |

(Continued)

FOREIGN PATENT DOCUMENTS

| CN | 101169831 A | 4/2008 |
| CN | 101889857 A | 11/2010 |

(Continued)

OTHER PUBLICATIONS

Brown et al., "Design and validation of an open-source library of dynamic reference frames for research and education in optical tracking," Journal of Medical Imaging, vol. 5, No. 2, Apr.-Jun. 2018, pp. 021215-1 to 021215-8 (9 pages total).

(Continued)

*Primary Examiner* — Nelson M Rosario
(74) *Attorney, Agent, or Firm* — Birch, Stewart, Kolasch & Birch, LLP

(57) ABSTRACT

An indicator device is suitable for a mixed reality device. The indicator device includes a body, a light source unit, at least two positioning elements, a triggering unit and a control unit. The light source unit is disposed on the body and generates a light source. The two elements are disposed separately on the body, wherein the light source unit and the positioning elements are disposed on different axes. The triggering unit is disposed on the body and generates a trigger signal. The control unit is disposed inside the body and is connected to the light source unit and the triggering unit. The control unit receives the trigger signal to generate a first control signal, thereby controlling the light-emitting state of the light source.

19 Claims, 9 Drawing Sheets

(58) Field of Classification Search
CPC ...... A63F 2300/1043; A63F 2300/1093; A63F 2300/6045; A63F 13/22; A63F 13/323; A63F 13/211; G06F 3/017; G06F 3/0304; G06F 3/0346; G06F 3/011; G06F 3/012; G06T 7/248; G06T 2207/10016
See application file for complete search history.

(56) References Cited

U.S. PATENT DOCUMENTS

| | | | | |
|---|---|---|---|---|
| 10,521,947 | B2* | 12/2019 | Yokokawa | G06F 3/014 |
| 2010/0105475 | A1* | 4/2010 | Mikhailov | A63F 13/06 |
| | | | | 463/33 |
| 2010/0304868 | A1* | 12/2010 | Zalewski | A63F 13/42 |
| | | | | 463/38 |
| 2011/0306413 | A1 | 12/2011 | Bickerstaff et al. | |
| 2013/0002550 | A1* | 1/2013 | Zalewski | G06F 3/033 |
| | | | | 345/158 |

FOREIGN PATENT DOCUMENTS

| | | |
|---|---|---|
| CN | 205507800 U | 8/2016 |
| EP | 1369769 A2 | 12/2003 |
| TW | 200940954 A | 10/2009 |
| TW | M384308 U | 7/2010 |
| TW | 201126451 A1 | 8/2011 |
| TW | 201205121 A1 | 2/2012 |
| TW | M479190 U | 6/2014 |
| TW | M497315 U | 3/2015 |
| TW | M518785 U | 3/2016 |
| TW | I574176 B | 3/2017 |
| TW | I581178 B | 5/2017 |
| TW | 201816720 A | 5/2018 |
| WO | WO 2015/091607 A | 6/2015 |

OTHER PUBLICATIONS

Chen et al., "Development of a surgical navigation system based on augmented reality using an optical see-through head-mounted display," Journal of Biomedical Informatics, vol. 55, 2015 (available online Apr. 13, 2015), pp. 124-131.

Decker et al., "A Biocompatible Near-Infrared 3D Tracking System," IEEE Trans Biomed Eng., vol. 64, No. 3, Mar. 2017, pp. 549-556 (23 pages total).

Harish et al., "Intraoperative visualization and assessment of electromagnetic tracking error," Proceedings of SPIE, vol. 9415, 2015, 7 pages.

Khadem et al., "Comparative Tracking Error Analysis of Five Different Optical Tracking Systems," Computer Aided Surgery, vol. 5, No. 2, 2000 (published online Jan. 6, 2010), pp. 98-107 (11 pages total).

Kuzhagaliyev et al., "Augmented reality needle ablation guidance tool for irreversible electroporation in the pancreas," Proceedings of SPIE, vol. 10576, 2018, 7 pages.

Ma et al., "Three-dimensional augmented reality surgical navigation with hybrid optical and electromagnetic tracking for distal intramedullary nail interlocking," Int J Med Robotics Comput Assist Surg., vol. 14, e1909, 2018, pp. 1-11.

Min et al., "Estimation of surgical tool-tip tracking error distribution in coordinate reference frame involving pivot calibration uncertainty," Healthcare Technology Letters, vol. 4, Issue 5, 2017, pp. 193-198.

Ribo et al., "A new Optical Tracking System for Virtual and Augmented Reality Applications," IEEE Instrumentation and Measurement, Technology Conference, Budapest, Hungary, May 21-23, 2001, 1932-1936.

Sukegawa et al., "Application of computer-assisted navigation systems in oral and maxillofacial surgery," Japanese Dental Science Review, JDSR-198, 2018, pp. 1-11.

Świątek-Najwer et al., "Improving surgical precision—application of navigation system in orthopedic surgery," Acta of Bioengineering and Biomechanics, vol. 10, No. 4, 2008, pp. 55-62.

Tseng et al., "Ultrasound-guided Navigation System for Neurosurgery," Journal of Medical and Biological Engineering, vol. 22, No. 2, 2002, pp. 83-89.

Wiles et al., "Accuracy assessment and interpretation for optical tracking systems," Proceedings of SPIE, vol. 5367, 2004, pp. 421-432 (13 pages total).

Yaniv, "Which Pivot Calibration?" Proceedings of SPIE, vol. 941527, 2015, 10 pages.

Zhou et al., "Optical surgical instrument tracking system based on the priciple of stereo vision," Journal of Biomedical Optics, vol. 22, No. 6, Jun. 2017, pp. 065005-1 to 065005-14 (15 pages total).

Taiwanese Office Action and Search Report for Taiwanese Application No. 107146029, dated Aug. 30, 2019.

* cited by examiner

INDICATOR DEVICE, MIXED REALITY DEVICE AND OPERATION METHOD THEREOF

TECHNICAL FIELD

The present disclosure relates to an indicator device, a mixed reality device and an operation method thereof.

BACKGROUND

With the advancements being made in technology, technologies such as virtual reality (VR), augmented reality (AR), and mixed reality (MR) become more mature, and more people increasingly adopt AR/VR/MR device, which can be made familiar with the user's input requirements for physical and virtual space. Therefore, the input requirements of the reality and virtual space for the user is increasing. Accordingly, the corresponding helmet devices increase in sophistication, and the spatial positioning technology used in the immersive experience become more important.

Currently, when a mixed reality helmet is used, the virtual image generated by the mixed reality helmet will be displayed in the real environment. If the user needs to wear the mixed reality helmet and point a position on the virtual image to discuss it with other users, the user and the other users will not directly see the user's finger in the virtual image. That is, the position at which the finger is pointing cannot be seen to cause confusion indication, so that the discussion is not facilitated. Accordingly, how to effectively and clearly generate an indication in mixed reality has become an important issue.

SUMMARY

The present disclosure provides an indicator device suitable a mixed reality device. The indicator device includes a body, a light source unit, at least two positioning elements, a triggering unit and a control unit. The light source unit is disposed on the body and generates a light source. The positioning elements are separately disposed on the body, wherein the light source unit and the positioning elements are disposed on different axes. The triggering unit is disposed on the body and generates a trigger signal. The control unit is disposed inside the body and connected to the light source unit and the triggering unit, wherein the control unit receives the trigger signal to generate a first control signal, so as to control the light-emitting state of the light source.

The present disclosure provides a mixed reality device, which includes an indicator device and a head-mounted device. The indicator device includes a body, a light source unit, at least two positioning elements, a triggering unit and a control unit. The light source unit is disposed on the body and generates a light source. The positioning elements are separately disposed on the body, wherein the light source unit and the positioning elements are disposed on different axes. The triggering unit is disposed on the body and generates a trigger signal. The control unit is disposed inside the body and connected to the light source unit and the triggering unit, wherein the control unit receives the trigger signal to generate a first control signal, so as to control the light-emitting state of the light source. The head-mounted device includes a projecting module, a photographing module and a processing unit. The projecting module projects a virtual image to a mixed reality space. The photographing module photographs the indicator device to generate an image. The processing unit is connected to the photographing unit, receives the image. The processing unit calculates the position of the light source unit of the indicator device in the mixed reality space according to the image of the light source unit and the positioning elements or the positioning elements. The processing unit records the motion image of the light source unit of the indicator device in the mixed reality space according to the light-emitting state of the light source, so as to generate a trajectory record.

The present disclosure provides an operation method of a mixed reality device, which includes the following steps. A trigger signal is generated by a triggering unit of an indicator device. A trigger signal is received by a control unit of the indicator device, so as to generate a first control signal. A light source unit of the indicator device is enabled to generate a light source and the light-emitting state of the light source may be controlled according to the first control signal, wherein the indicator device includes at least two positioning elements, and the light source unit and the positioning elements are disposed on different axes. A virtual image is projected to a mixed reality space by a projecting module of a head-mounted device. The indicator device is photographed by a photographing module of the head-mounted device, so as to generate an image. The image is received by a processing unit of the head-mounted device. The position of the light source unit of the indicator device in the mixed reality space is calculated according to the image of the light source unit and the positioning elements or the positioning elements. The motion image of the light source unit of the indicator device in the mixed reality space is recorded according to the light-emitting state of the light source, so as to generate a trajectory record.

BRIEF DESCRIPTION OF DRAWINGS

The present disclosure can be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1:
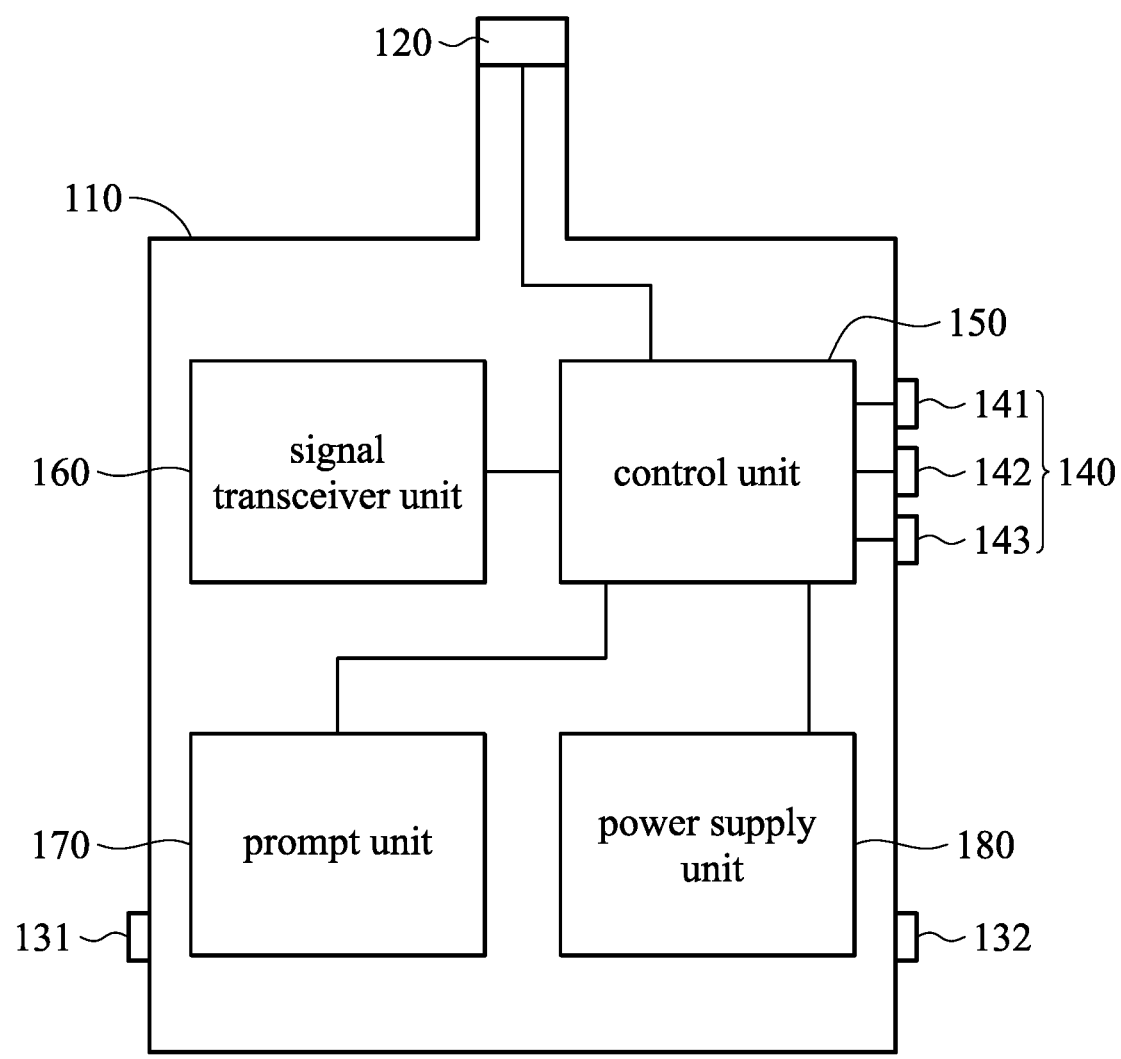
FIG. 1 is a schematic view of an indicator device according to an embodiment of the present disclosure.

FIG. 1 is a schematic view of an indicator device according to an embodiment of the present disclosure. Please refer to FIG. 1, the indicator device 100 of the embodiment is suitable to a mixed reality device. The indicator device 100 includes a body 110, a light source unit 120, at least two positioning elements 131 and 132, a triggering unit 140 and a control unit 150. In the embodiment, the body is, for example, a case for the indicator device 100.

The light source unit 120 is disposed on the body 110 and the light source unit 120 is used to generate a light source. In the embodiment, the light source unit 120 includes, for example, a light emitting diode and/or a laser source.

The positioning elements 131 and 132 are separately disposed on the body 110. The light source unit 120 and the positioning elements 131 and 132 are disposed on different axes, as shown in FIGS. 2A, 2B, 2C, 2D, 2E and 2F, respectively. That is, the positions of light source unit 120 and the positioning elements 131 and 132 are not located on the same axis, i.e., the positions of light source unit 120 and the positioning elements 131 and 132 do not form a straight line. FIGS. 2A, 2B, 2C, 2D, 2E and 2F are only some embodiments of the present disclosure and are not intended to limit the present disclosure. The user may adjust the positions of the light source unit 120 and the positioning elements 131 and 132 disposed on the body 110 according to the requirement thereof, and the adjustments belong to the protection scope of the present disclosure.

In addition, the positioning elements 131 and 132 include, for example, spheres or protrusions. The surface of the above sphere may be a uniform reflection surface, or the sphere may be a light source. Moreover, the above protrusion may protrude from the body or extend from the body. Therefore, the positioning accuracy of the indicator device 100 in the mixed reality can be increased through such an arrangement.

Figure 2B:
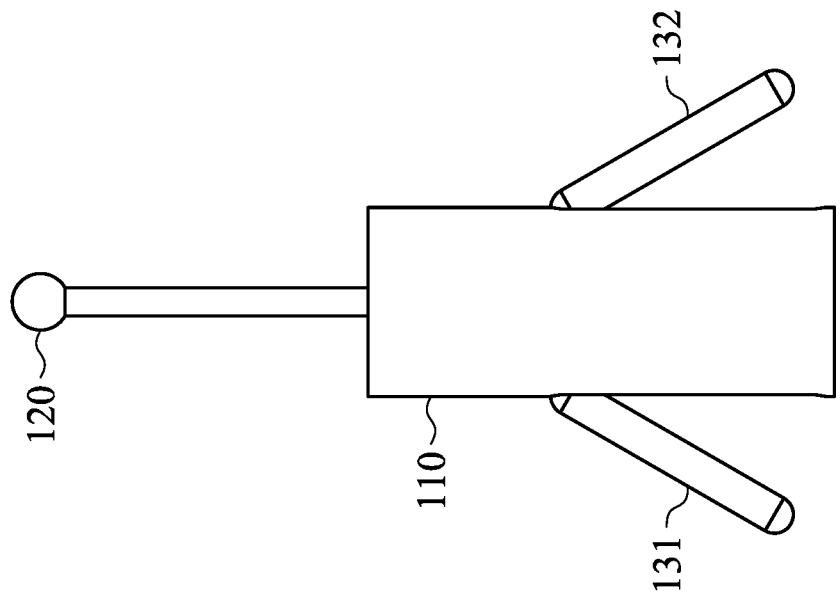
FIGS. 2A-2F are schematic views of a configuration relationship of a light source unit and positioning elements in FIG. 1.
Figure 2A:
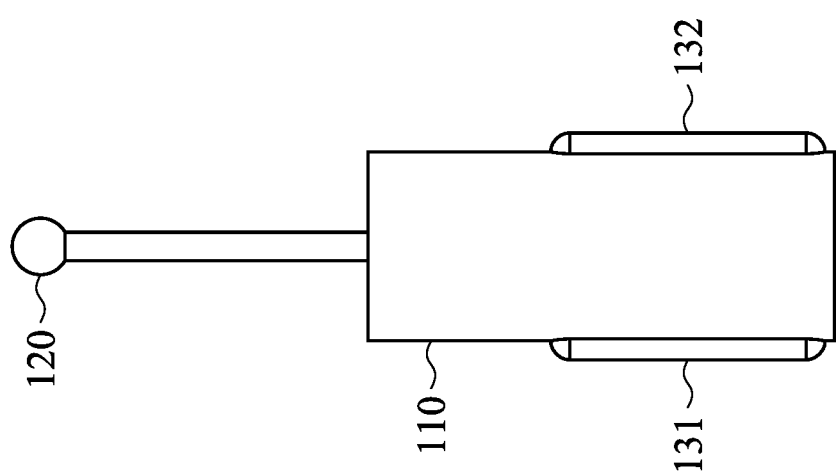
Figure 2D:
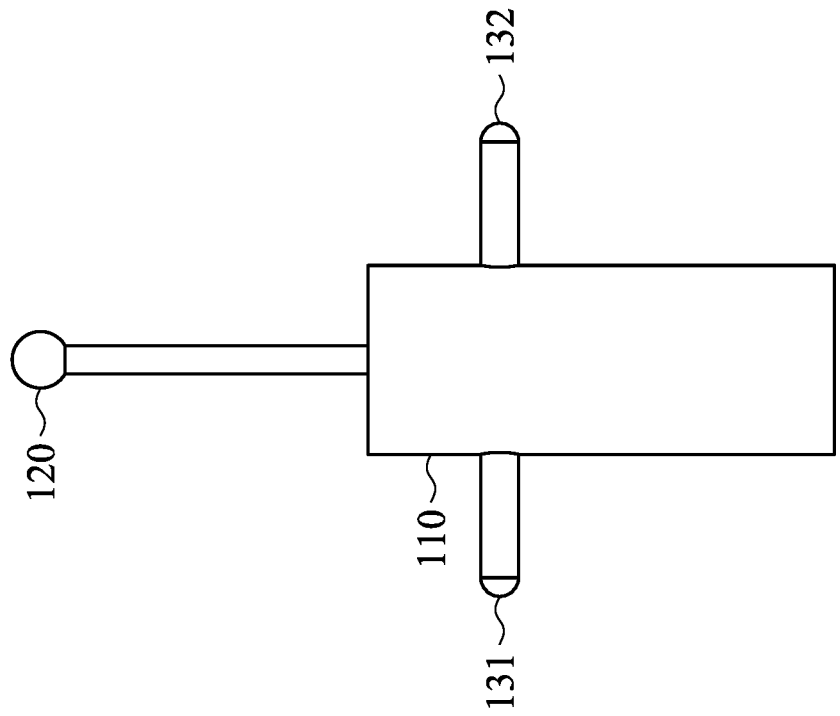
Figure 2C:
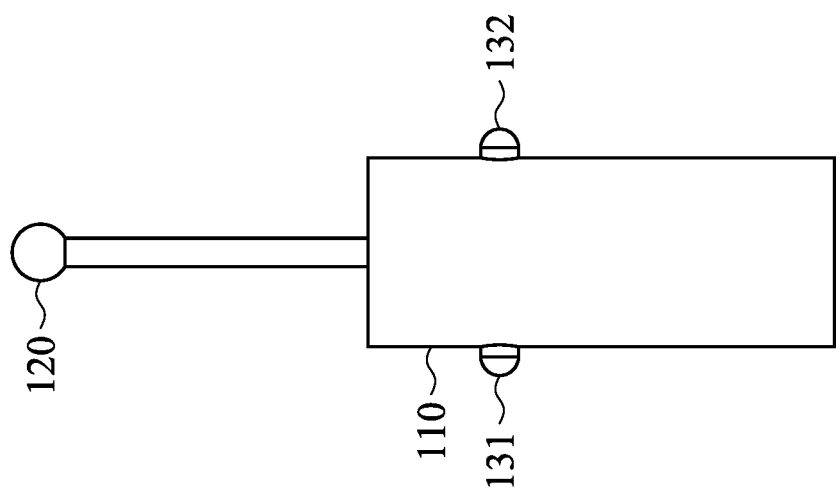

In one embodiment, the positioning elements 131 and 132 are telescopically disposed on the body 110. The positioning elements 131 and 132 can be contracted into the body 110, as shown in FIGS. 2A and 2C. Besides, the positioning elements 131 and 132 can extend out of the body 110, as shown in FIGS. 2B and 2D.

Figure 2F:
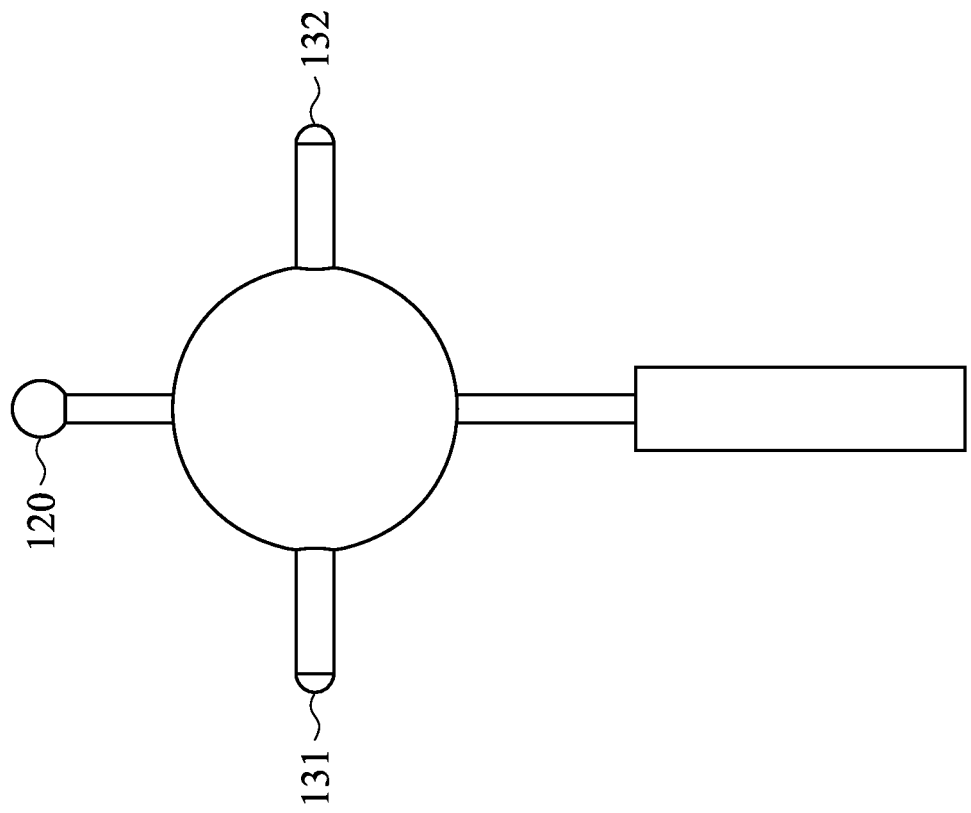
Figure 2E:
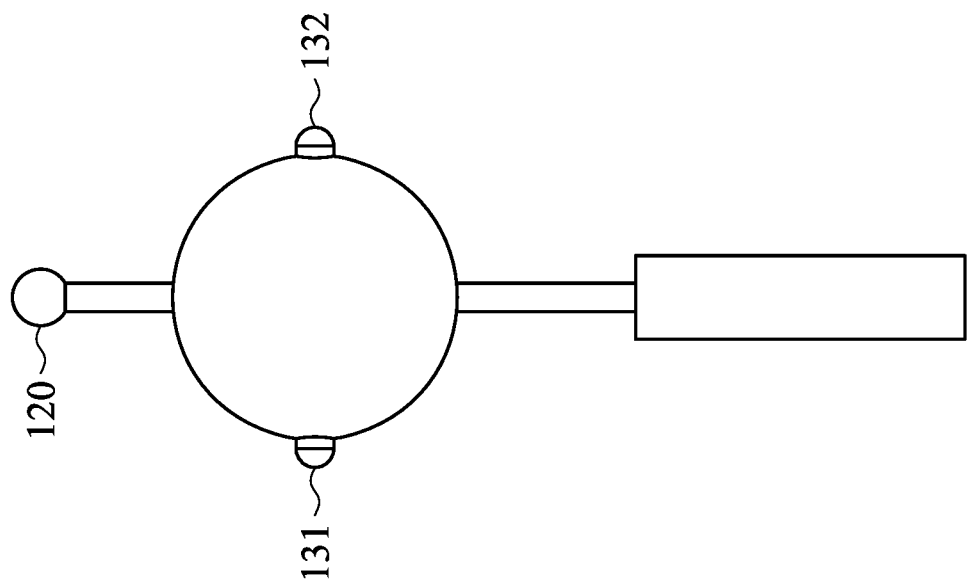

In addition, the positioning elements 131 and 132 may also be folded on the body 110 or deployed on the body 110. The positioning elements 131 and 132 can also be folded on the body 110, as shown in FIG. 2E. The positioning elements 131 and 132 can be deployed on the body 110, as shown in FIG. 2F. The number of the positioning elements in the embodiment is exemplified by two, but it is not intended to limit the present disclosure. The user may also set the number of positioning components to three or more according to the requirement thereof, so as to increase the positioning accuracy. The three or more positioning elements and the light source unit 120 may still disposed on different axes.

The triggering unit 140 is disposed on the body and the triggering unit 140 generates a trigger signal. That is, the user may operate the triggering unit 140, so that the triggering unit 140 correspondingly generates the trigger signal.

The control unit 150 is disposed inside the body 110 and the control unit 150 is connected to the light source unit 120 and the triggering unit 140. The control unit 150 receives the trigger signal to generate a first control signal, so as to control the light-emitting state of the light source.

In the embodiment, the light-emitting state of the above light source includes light-emitting, flashing, no light-emitting and change of color or brightness. The triggering unit 140 includes a first button 141 and a second button 142. The first button 141 is used to control the light-emitting state of the light source in terms of emitting light, flashing light or emitting no light. That is, the user may operate the first button 141 to generate a corresponding trigger signal, so that the light source unit 120 generates a steady light, a flashing light, or no light at all.

For example, the user presses the first button 141 once to generate the trigger signal, so that the control unit 150 generates the first control signal, so as to control the light source unit 120 to generate the steady light. Then, the user presses the first button 141 again to generate the trigger signal, so that the control unit 150 generates the first control signal, so as to control the light source unit 120 to generate the flashing light. Afterward, the user presses the first button 141 again to generate the trigger signal, so that the control unit 150 generates the first control signal, so as to turn off the light source unit 120 so that it does not emit light.

In another embodiment, the user presses the first button 141 once to generate the trigger signal, so that the control unit 150 generates the first control signal, so as to control the light source unit 120 to generate the light-emitting. The user continuously presses the first button 141 twice to generate the trigger signal, so that the control unit 150 generates the first control signal, so as to control the light source unit 120 to generate the flashing. The user continuously presses the first button 141 three times or the user presses the first button 141 for a long time (for example, 3 seconds) to generate the trigger signal, so that the control unit 150 generates the first control signal, so as to turn off the light source unit 120 and not generate the light-emitting.

In addition, the second button 142 is used to control the light-emitting state of the light source in terms of color or brightness. That is, the user presses the second button 142 to generate the trigger signal, so that the control unit 150 generates the first control signal, so as to control the color or brightness of the light source unit 120.

Furthermore, when the light source unit 120 includes the light emitting diode and the laser source at the same, the triggering unit 140 further includes a third button. The third button 143 is used to switch between the light emitting diode and the laser source mode. That is, the user presses the third button 143 to generate the trigger signal, so that the control unit 150 to generate the first control signal, so as to switch the light emitting diode or the laser source.

Further, the indicator device 100 further includes a signal transceiver unit 160, a prompt unit 170 and a power supply unit 180.

The signal transceiver unit 160 is disposed inside the body 110 and connected to the control unit 150, receives a prompt signal and transmits the prompt signal to the control unit 150. In the embodiment, the signal transceiver unit 160 may be a wireless transceiver, which transmits signals, for example, through Wireless Fidelity (Wi-Fi), Bluetooth, or the like. That is, the transceiver unit 160 receives the prompt signal of the external device in a wireless manner and transmits the prompt signal to the control unit 150. After the control unit 150 receives the prompt signal, the control unit 150 may generate a second control signal.

The prompt unit 170 is disposed inside the body 110 and connected to the control unit 150, receives the second control signal, so as to provide a prompt message. In one embodiment, the prompt unit 170 may be a speaker or a buzzer. That is, when the prompt unit 170 receives the second control signal, the prompt unit 170 may generate the prompt message with voice. In another embodiment, the prompt unit 170 may be a vibration motor. That is, when the prompt unit 170 receives the second control signal, the prompt unit 170 may generate the prompt message with vibration. Certainly, the above prompt unit 170 is, for example, the speaker, the buzzer or the vibration motor, but not intended to limit the present disclosure. The user may also adjust or modify the prompt unit 170 to other elements for generating the prompt message, and the other elements may still achieve the same effect. Therefore, the user may know that the external device generates the prompt signal to perform the corresponding response through the prompt message generated by the prompt unit 170.

The power supply unit 180 is disposed inside the body 110 and connected to the control unit 150. The power supply unit provides a working voltage to the control unit 150, so that the control unit may operate normally. Further, the power supply unit 180 may be a battery, a charging battery, etc.

Figure 3:
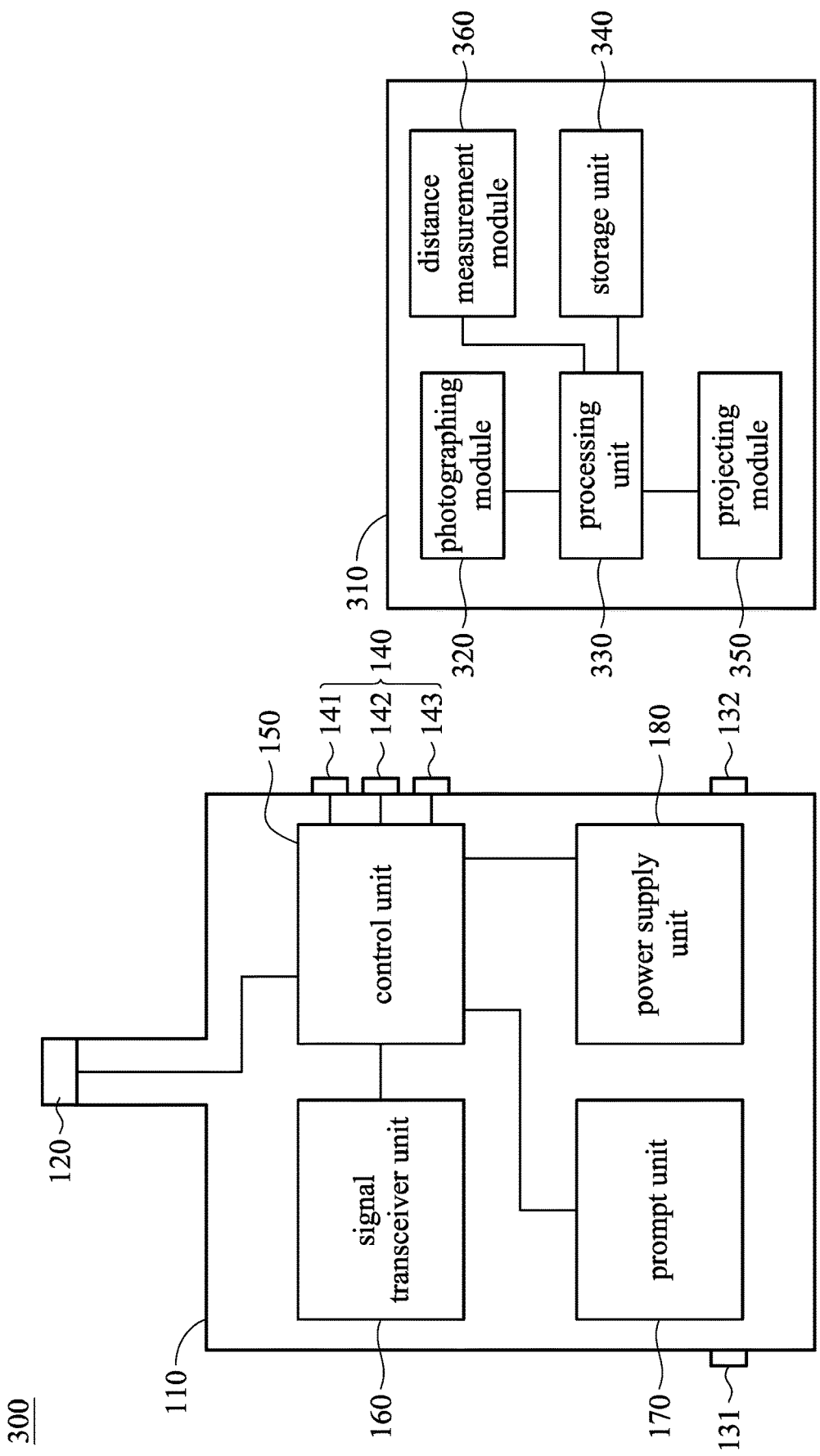
FIG. 3 is a schematic view of a mixed reality device according to an embodiment of the present disclosure.

FIG. 3 is a schematic view of a mixed reality device according to an embodiment of the present disclosure. Please refer to FIG. 3, the mixed reality device 300 includes an indicator device 100 and a head-mounted device 310. The indicator device 100 is, for example, held by the user, and the head-mounted device 310 is, for example, mounted on a head of the user. Therefore, the user may see the virtual image projected by the head-mounted device 310 and may see the virtual image in the real environment.

The indicator device 100 includes a body 110, a light source unit 120, at least two positioning elements 131 and 132, a triggering unit 140, a control unit 150, a signal transceiver unit 160, a prompt unit 170 and a power supply unit 180. The body 110, the light source unit 120, the positioning elements 131 and 132, the triggering unit 140, the control unit 150, the signal transceiver unit 160, the prompt unit 170 and the power supply unit 180 in FIG. 3 are the same as FIG. 1 and may be described by the embodiment in FIG. 1, and the description thereof is not repeated here. In addition, the configuration relationship of the light source unit 120 and the positioning elements 131 and 132 may also be described by the embodiments in FIGS. 2A to 2F, and the description thereof is not repeated here.

The head-mounted device 310 includes a photographing module 320 and a processing unit 330. The photographing module 320 photographs the indicator device 100 to generate an image. In the embodiment, the photographing module 320 may include one or more cameras, and the photographing module 320 is disposed on the head-mounted device 310 for photographing the indicator device 100.

The processing unit 330 is connected to the photographing module 320 and receives the image generated by the photographing module 320. In one embodiment, the processing unit 330 may calculates the position of the light source unit 120 of the indicator device 100 in the mixed reality space according to the image of the light source unit 120 and the positioning elements 131 and 132. That is, when the processing unit 330 receives the above image, the processing unit 330 performs a triangulation algorithm to calculate the light source unit 120 and the positioning elements 131 and 132, for example, to obtain a coordinate position of the light source unit 120 of the indicator device 100. Then, the processing unit 330 positions the light source unit 120 of the indicator device 100 in the mixed reality space.

In another embodiment, when the processing unit 330 receives the above image, the processing unit 330 performs a positioning algorithm to calculate the position the positioning elements 131 and 132, for example, to obtain a coordinate position of the light source unit 120 of the indicator device 100. Then, the processing unit 330 positions the light source unit 120 of the indicator device 100 in the mixed reality space.

In addition, assuming that the number of the position elements of the indicator device 100 is three or more than three, and the three or more positioning elements and the light source unit 120 are disposed on different axes, so as to increase the accuracy of the positioning. When the processing unit 330 receives the above image, the processing unit 330 performs a triangulation algorithm to calculate the three or more positioning elements, for example, to obtain a coordinate position of the light source unit 120 of the indicator device 100. Then, the processing unit 330 positions the light source unit 120 of the indicator device 100 in the mixed reality space.

The processing unit 330 may record the motion image of the light source unit 120 of the indicator device 100 in the mixed reality space according to the light-emitting state of the light source, so as to generate the trajectory record. That is, when the user causes the light source unit 120 to generate a flashing light source by operating the trigger unit 140, the processing unit 330 may start to record the motion of the light source unit 120 of the indicator device 100 in the mixed reality space according to the flashing light source, so as to generate a trajectory record. In the embodiment, the above trajectory record may be the motion trajectory of the light source unit 120 in the mixed reality space, and may also be the motion trajectory of the light source unit 120 on a virtual image in the mixed reality space.

The above processing unit 330 records the motion of the light source unit 120 of the indicator device 100 in the mixed reality space according to the light-emitting state of the light source. In addition, the triggering unit 140 may also include a fourth button. The user may operate (press) the fourth button to generate the trigger signal, so that the control unit 150 generates a third control signal according to the trigger signal. The third control signal may be transmitted to the processing unit 330 of the head-mounted device 310 through the signal transceiver unit 160. When the processing unit 330 receives the third control signal, the processing unit 330 starts to record the motion of the light source unit 120 of the indicator device 100 in the mixed reality space, so as to generate the trajectory record.

Furthermore, in the embodiment, the head-mounted device 310 further includes a storage unit 340 and a projecting module 350. The storage unit 340 is connected to the processing unit 330. The storage unit 340 stores the trajectory record generated by the processing unit 330 and also stores the information of the virtual image to be projected.

The projecting module 350 is connected to the processing unit 330 and projects the virtual image in the mixed reality space. That is, the processing unit 330 reads the virtual image to be projected from the storage unit 340, then the processing unit 330 may control the projecting module 350 to project the virtual image in the mixed reality space. Therefore, the user may see the virtual image in the mixed reality space through the head-mounted device 310.

Furthermore, when the light source unit 120 includes the laser light source, the head-mounted device 310 further includes a distance measurement module 360. The distance measurement module 360 is connected to the processing unit 330. The distance measurement module 360 measures the distance between the light source unit 120 and a laser point projected by the light source unit 120 in the mixed reality space. Then, the processing unit 330 further obtains the position of the laser point in the mixed reality space according to the distance, and records the motion of the laser point in the mixed reality space, so as to generate the trajectory record. In the embodiment, the above trajectory record may be the motion trajectory of the laser point in the mixed reality space and may also be the motion trajectory of the laser point on the virtual image in the mixed reality space.

Furthermore, the processing unit 330 further compares the trajectory record with a predetermined trajectory to generate the prompt signal. The trajectory record is obtained according to the motion trajectory generated by the user moving the light source unit 120 of the indicator device 100. That is, processing unit 330 generates the trajectory record, then the processing unit 330 may compares the trajectory record with the predetermined trajectory stored in the storage unit 340, so as to generate the prompt signal. For example, when the trajectory record matches the predetermined trajectory, the processing unit 330 does not generate the prompt signal. When the trajectory record does not match the predetermined trajectory, the processing unit 330 may generate the prompt signal.

Then, the prompt signal generated by the processing unit 330 is transmitted to the signal transceiver unit 160 of the indicator device 100. Afterward, the signal transceiver unit 160 transmits the prompt signal to the control unit 150. Accordingly, the control unit 150 generates the second control signal to the prompt unit 170, so that the prompt unit 170 generates the prompt message (such as a sound or a vibration). Therefore, the user may know the motion trajectory of the light source unit 120 of the indicator device 100 not matching the predetermined trajectory through the prompt message generated by the prompt unit 170. Accordingly, the user may adjust the motion trajectory of the light source unit 120 of the indicator device 100.

In the embodiment, the predetermined trajectory stored in the storage unit 340 may be preset by the user or a trajectory record generated by the user operating the indicator device 100 at last time, so as to facilitate the subsequent discussion and use.

Figure 4:
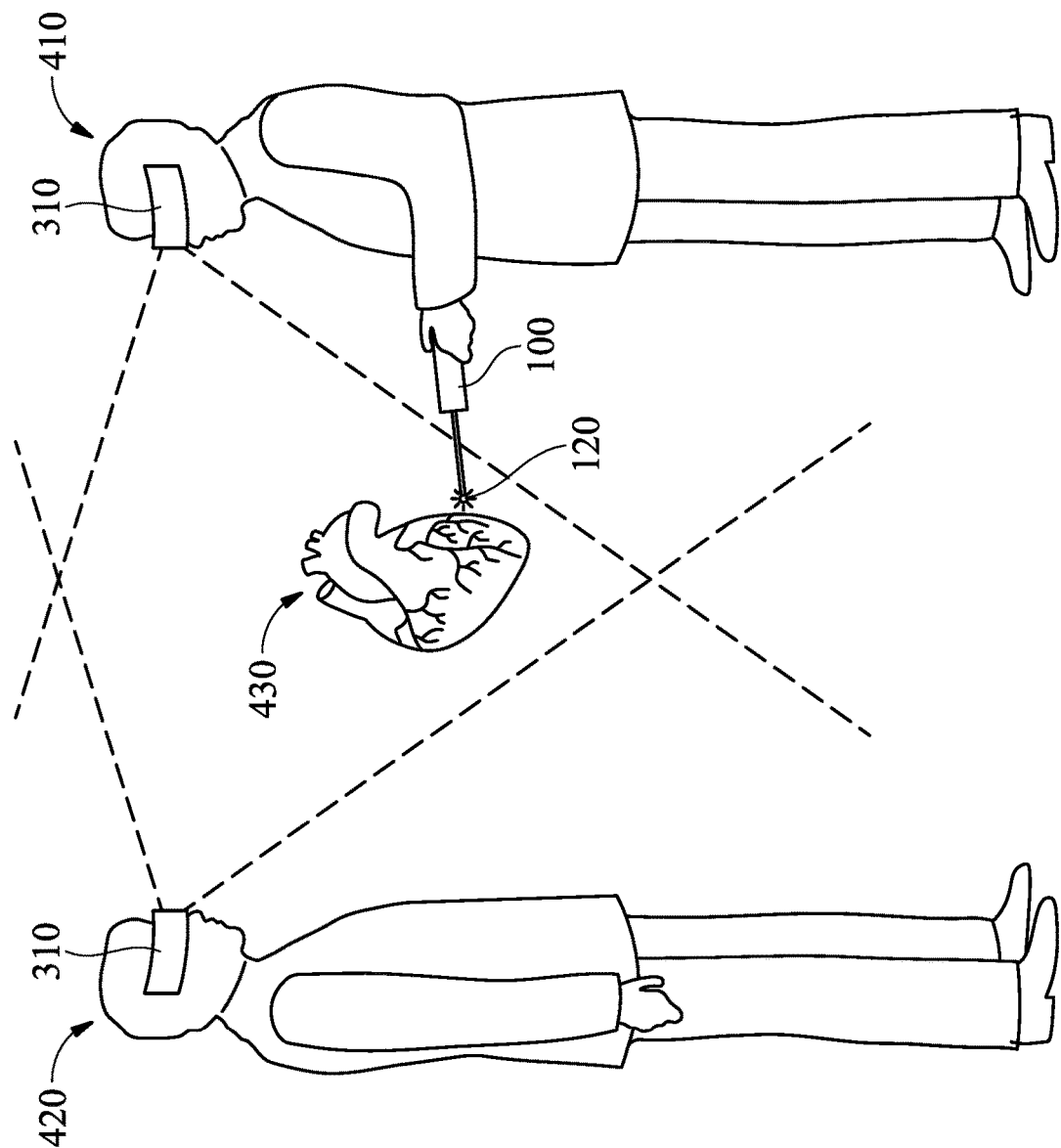
FIG. 4 is a schematic view of an operating situation of the mixed reality device according to an embodiment of the present disclosure.

FIG. 4 is a schematic view of an operating situation of the mixed reality device according to an embodiment of the present disclosure. Please refer to FIG. 4, the users 410 and 420 respectively wear the head-mounted device 310. The projecting module 350 of the head-mounted device 310 projects the virtual image 430 in the mixed reality space. Then, the user 410 holds the indicator device 100 and operates the indicator device 100, so that the light source unit 120 (such as the light emitting diode) generates the light source. Therefore, the users 410 and 420 may clearly see the position indicated by the user 410 on the virtual image 430 through the light source generated by the light source unit 120. Accordingly, the discussion of the users 410 and 420 is facilitated and the convenience of use is increased.

The user 410 may also operate the indicator device 100, so that the light source unit 120 generates the flashing light source, or the user 410 may operate the triggering unit 140 of the indicator device 100 to generate the trigger signal. Accordingly, the head-mounted device 310 may record the motion of the light source unit 120 of the indicator device 100 to generate the trajectory record, so as to facilitate the subsequent discussion and use. In the embodiment, the operating situation of the mixed reality device 300 may be applied, for example, to an operating environment, such as medicine (surgery or anatomy), maintenance device, or remote teaching.

FIG. 4 shows that the user 410 holds indicator device 100, but not intended to limit the present disclosure. The users 410 and 420 may hold the indicator devices 100 at the same time and operate the indicator devices 100 in the mixed reality space. The users 410 and 420 may change the color or the brightness of the light source generated by the light source unit 120 through the triggering unit 140. Accordingly, the positions indicated by the indicator devices 100 held by the users 410 and 420 are effectively distinguished. Therefore, the discussion of the users 410 and 420 is facilitated and the convenience of use is increased.

Similarly, the users 410 and 420 may also operate the indicator devices 100, so that the light source units 120 generate the flashing light sources, or the users 410 and 420 may operate the triggering units 140 of the indicator devices 100 to generate the trigger signals. Accordingly, the head-mounted devices 310 may record the motions of the light source units 120 of the indicator devices 100 to generate the trajectory records, so as to facilitate the subsequent discussion and use.

Figure 5:
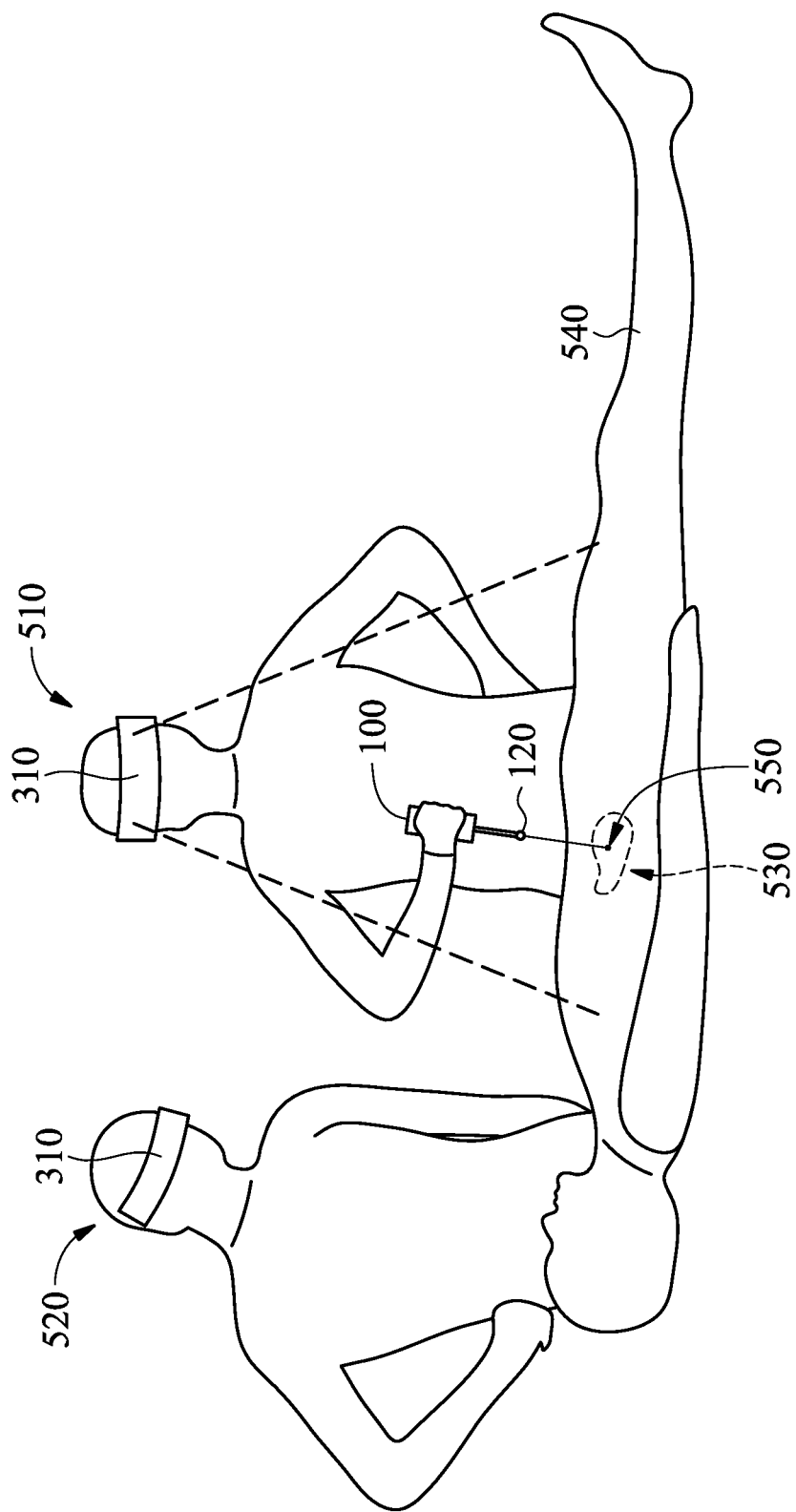
FIG. 5 is a schematic view of an operating situation of the mixed reality device according to another embodiment of the present disclosure.

FIG. 5 is a schematic view of an operating situation of the mixed reality device according to another embodiment of the present disclosure. Please refer to FIG. 5, the users 510 and 520 respectively wear the head-mounted device 310. The projecting module 350 of the head-mounted device 310 projects the virtual image 530 in the mixed reality space. The virtual image 530 is projected on an object 540. The object 540 is, for example, a human body, and the virtual image 530 includes, for example, internal organs of the human body. However, embodiments of the present disclosure are not limited thereto. The object 540 may also be other actual objects, such as a vehicle, and the virtual image 530 includes, for example, internal structures corresponding to the object 540.

The user 510 holds the indicator device 100 and operates the indicator device 100, so that the light source unit 120 (such as the laser light source) generates the light source (i.e., a laser point 550) on the object 540. Accordingly, the problem in which the indicator device 100 directly contacts the object 540 or the position to be indicated may be unable to effectively indicate is avoided. Therefore, the users 510 and 520 may clearly see the position indicated by the user 510 on the virtual image 530 through the light source (i.e., the laser point 550) generated by the light source unit 120. Accordingly, the discussion of the users 510 and 520 is facilitated and the convenience of use is increased.

The user 510 may also operate the indicator device 100, so that the light source unit 120 generates the flashing light source, or the user 510 may operate the triggering unit 140 of the indicator device 100 to generate the trigger signal. Accordingly, the head-mounted device 310 may record the motion of the light source (i.e., the laser point 550) generated by the light source unit 120 of the indicator device 100 to generate the trajectory record, so as to facilitate the subsequent discussion and use.

FIG. 5 shows that the user 510 holds indicator device 100, but not intended to limit the present disclosure. The users 510 and 520 may both hold the indicator devices 100 at the same time and operates the indicator devices 100 in the mixed reality space. The users 510 and 520 may change the color or the brightness of the light source (i.e., the laser point 550) generated by the light source unit 120 through the triggering unit 140. Accordingly, the positions indicated by the indicator devices 100 being held by the users 510 and 520 are easily distinguished. Therefore, the discussion of the users 510 and 520 is facilitated and the convenience of use is increased.

Similarly, the users 510 and 520 may also operate the indicator devices 100, so that the light source units 120 generate the flashing light sources, or the users 510 and 520 may operate the triggering units 140 of the indicator devices 100 to generate the trigger signals. Accordingly, the head-mounted devices 310 may record the motions of the light source (i.e., the laser points 550) generated by the light source units 120 of the indicator devices 100 to generate the trajectory records, so as to facilitate the subsequent discussion and use.

Figure 6:
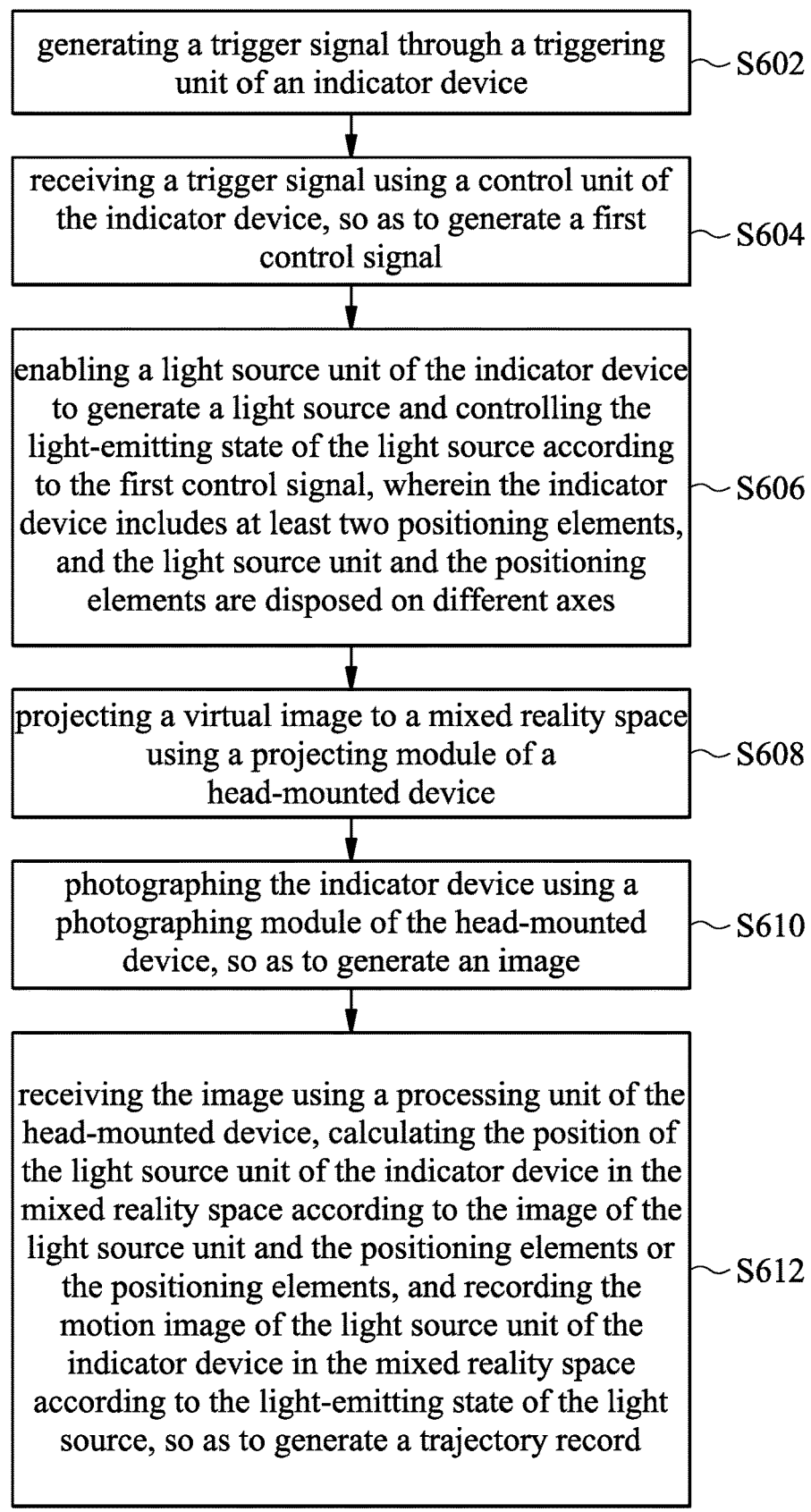
FIG. 6 is a flowchart of an operation method of a mixed reality device according to an embodiment of the present disclosure.

According to the above-mentioned description, the above embodiments may introduce an operation method of a mixed reality device. FIG. 6 is a flowchart of an operation method of a mixed reality device according to an embodiment of the present disclosure.

In step S602, the method involves generating a trigger signal through a triggering unit of an indicator device. In step S604, the method involves receiving a trigger signal using a control unit of the indicator device, so as to generate a first control signal.

In step S606, the method involves enabling a light source unit of the indicator device to generate a light source and controlling the light-emitting state of the light source according to the first control signal, wherein the indicator device includes at least two positioning elements, and the light source unit and the positioning elements are disposed on different axes. In step S608, the method involves projecting a virtual image to a mixed reality space using a projecting module of a head-mounted device. In step S610, the method involves photographing the indicator device using a photographing module of the head-mounted device, so as to generate an image.

In step S612, the method involves receiving the image using a processing unit of the head-mounted device, calculating the position of the light source unit of the indicator device in the mixed reality space according to the image of the light source unit and the positioning elements or the positioning elements, and recording the motion image of the light source unit of the indicator device in the mixed reality space according to the light-emitting state of the light source, so as to generate a trajectory record. In the embodiment, the light-emitting state of the above light source includes emitting light, flashing light, emitting no light and change of color or brightness. The light source unit includes a light emitting diode and/or a laser source.

Figure 7:
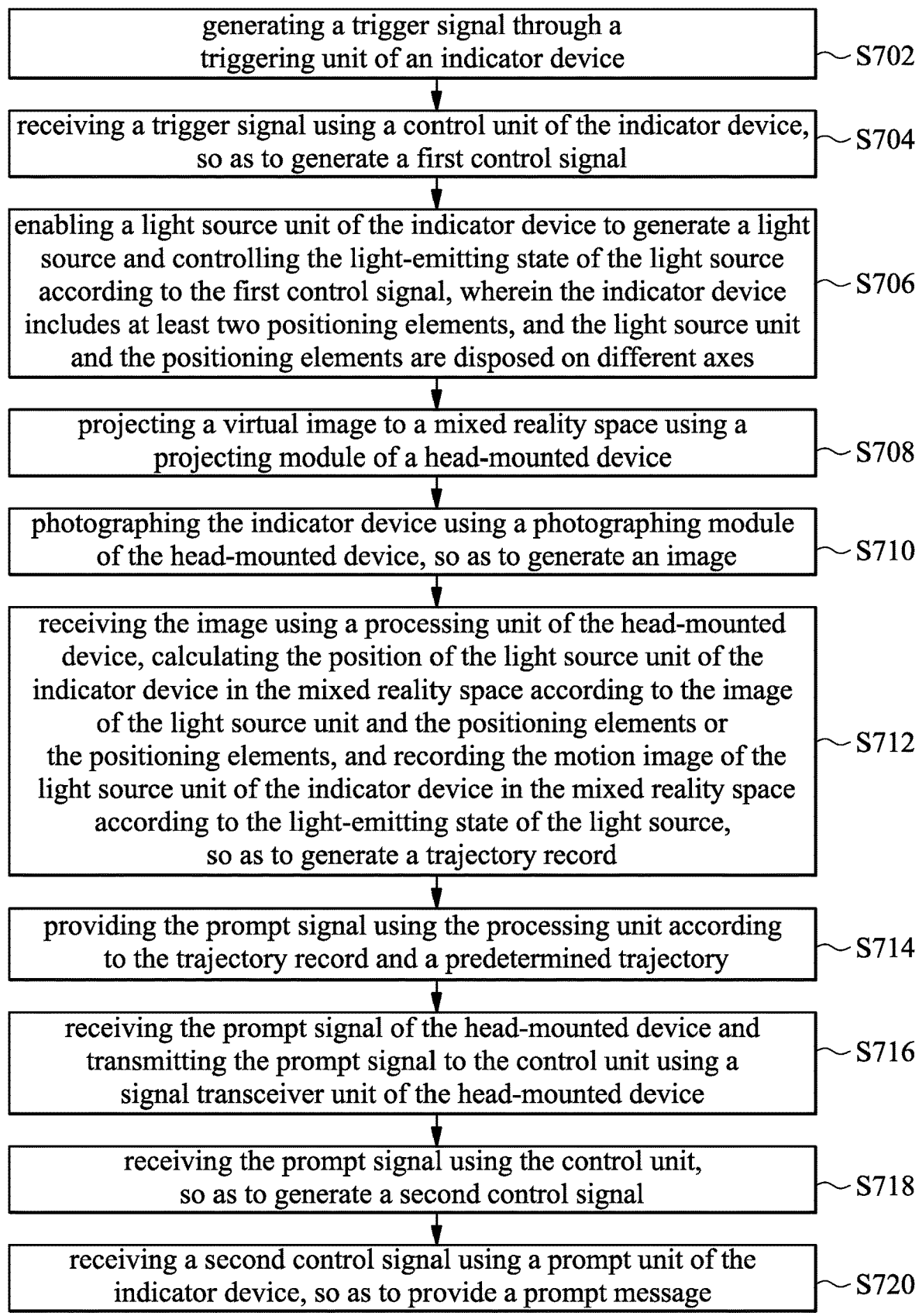
FIG. 7 is a flowchart of an operation method of a mixed reality device according to another embodiment of the present disclosure.

FIG. 7 is a flowchart of an operation method of a mixed reality device according to another embodiment of the present disclosure. In step S702, the method involves generating a trigger signal through a triggering unit of an indicator device. In step S704, the method involves receiving a trigger signal using a control unit of the indicator device, so as to generate a first control signal.

In step S706, the method involves enabling a light source unit of the indicator device to generate a light source and controlling the light-emitting state of the light source according to the first control signal, wherein the indicator device includes at least two positioning elements, and the light source unit and the positioning elements are disposed on different axes.

In step S708, the method involves projecting a virtual image to a mixed reality space using a projecting module of a head-mounted device. In step S710, the method involves photographing the indicator device using a photographing module of the head-mounted device, so as to generate an image. In step S712, the method involves receiving the image using a processing unit of the head-mounted device, calculating the position of the light source unit of the indicator device in the mixed reality space according to the image of the light source unit and the positioning elements or the positioning elements, and recording the motion image of the light source unit of the indicator device in the mixed reality space according to the light-emitting state of the light source, so as to generate a trajectory record.

In step S714, the method involves providing the prompt signal using the processing unit according to the trajectory record and a predetermined trajectory. In step S716, the method involves receiving the prompt signal of the head-mounted device and transmitting the prompt signal to the control unit using a signal transceiver unit of the head-mounted device.

In step S718, the method involves receiving the prompt signal using the control unit, so as to generate a second control signal. In step S720, the method involves receiving a second control signal using a prompt unit of the indicator device, so as to provide a prompt message. In the embodiment, the light-emitting state of the above light source includes emitting light, flashing light, emitting no light and change of color or brightness. The light source unit includes a light emitting diode and/or a laser source.

In summary, according to the indicator device, the mixed reality device and the operation method thereof of the embodiments of the present disclosure, the light source unit and the positioning elements are disposed on different axes. The triggering unit generates the trigger signal, so that the control unit generates the first control signal according to the trigger signal, so as to control the light-emitting state of the light source. The photographing module of the head-mounted device photographs the indicator device to generate an image. The processing unit calculates the position of the light source unit of the indicator device in the mixed reality space according to the image of the light source unit and the positioning elements or the positioning elements. Then, the processing unit records the motion image of the light source unit of the indicator device in the mixed reality space according to the light-emitting state of the light source, so as to generate a trajectory record. Therefore, the position indicated on the virtual image may be effectively viewed, so that the subsequent discussion is facilitated and the convenience of use is increased. The motion of the light source unit of the indicator device may be recorded, so as to facilitate the subsequent discussion and use.

In addition, the processing unit may generate the prompt signal according to the trajectory record and the predetermined trajectory, so that the control unit correspondingly control the prompt unit to generate the prompt message. Therefore, the user may know that the motion trajectory of the light source unit of the indicator device does not match the predetermined trajectory and accordingly adjust the motion trajectory of the light source unit of the indicator device, so as to increase the convenience of use.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An indicator device, suitable to a mixed reality device, wherein the indicator device comprises:
   a body;
   a light source unit, disposed on the body and generating a light source;
   at least two positioning elements, separately disposed on the body, wherein the light source unit and the at least two positioning elements are disposed on different axes, the at least two positioning elements comprise spheres or protrusions, and the positions of the light source unit and the at least two positioning elements do not form a straight line;
   a triggering unit, disposed on the body and generating a trigger signal; and
   a control unit, disposed inside the body and connected to the light source unit and the triggering unit, wherein the control unit receives the trigger signal to generate a first control signal, and controls a light-emitting state of the light source.

2. The indicator device as claimed in claim 1, further comprising:
   a signal-transceiver unit, disposed inside the body and connected to the control unit, receiving a prompt signal and transmitting the prompt signal to the control unit; and
   a prompt unit, disposed inside the body and connected to the control unit, receiving a second control signal, and providing a prompt message;
   wherein the control unit further receives the prompt signal to generate the second control signal.

3. The indicator device as claimed in claim 1, wherein the light-emitting state of the light source comprises emitting light, flashing light, emitting no light and change of color or brightness.

4. The indicator device as claimed in claim 3, wherein the triggering unit comprises a first button and a second button, wherein the first button is used to control the light-emitting state of the light source in terms of emitting light, flashing light or emitting no light, and the second button is used to control the light-emitting state of the light source in terms of color or brightness.

5. The indicator device as claimed in claim 1, wherein the light source unit comprises a light emitting diode and/or a laser source.

6. The indicator device as claimed in claim 1, further comprising:
   a power supply unit, disposed inside the body and connected to the control unit, wherein the power supply unit provides a working voltage.

7. A mixed reality device, comprising:
   an indicator device, comprising:
      a body;
      a light source unit, disposed on the body and generating a light source;
      at least two positioning elements, separately disposed on the body, wherein the light source unit and the at least two positioning elements are disposed on different axes, the at least two positioning elements comprise spheres or protrusions, and the positions of the light source unit and the at least two positioning elements do not form a straight line;
      a triggering unit, disposed on the body and generating a trigger signal; and
      a control unit, disposed inside the body and connected to the light source unit and the triggering unit, wherein the control unit receives the trigger signal to generate a first control signal, and controls the light-emitting state of the light source; and
   a head-mounted device, comprising:
      a projecting module, projecting a virtual image to a mixed reality space comprising a real environment;
      a photographing module, photographing the indicator device to generate an image; and
      a processing unit, connected to the photographing unit, receiving the image, calculating a position of the light source unit of the indicator device in the mixed reality space according to the image of the light source unit and the at least two positioning elements or the at least two positioning elements, and recording a motion image of the light source unit of the indicator device in the mixed reality space according to the light-emitting state of the light source, and generating a trajectory record.

8. The mixed reality device as claimed in claim 7, wherein the indicator device further comprises:
   a signal transceiver unit, disposed inside the body and connected to the control unit, receiving a prompt signal of the head-mounted device and transmitting the prompt signal to the control unit; and
   a prompt unit, disposed inside the body and connected to the control unit, receiving a second control signal, and providing a prompt message;
   wherein the control unit further receives the prompt signal to generate the second control signal.

9. The mixed reality device as claimed in claim 8, wherein the processing unit further provides the prompt signal according to the trajectory record and a predetermined trajectory.

10. The mixed reality device as claimed in claim 7, wherein the light-emitting state of the light source comprises emitting light, flashing light, emitting no light and change of color or brightness.

11. The mixed reality device as claimed in claim 10, wherein the triggering unit comprises a first button and a second button, wherein the first button is used to control the light-emitting state of the light source in terms of emitting light, flashing light or emitting no light, and the second button is used to control the light-emitting state of the light source in terms of color or brightness.

12. The mixed reality device as claimed in claim 7, wherein the light source unit comprises a light emitting diode and/or a laser source.

13. The mixed reality device as claimed in claim 7, wherein when the light source unit comprises the laser source, the mixed reality device further comprises:
   a distance measurement module, connected to the processing unit, measuring a distance between the light source unit and a laser point projected by the light source unit in the mixed reality space;
   wherein the processing unit further obtains a position of the laser point in the mixed reality space according to the distance, and records a motion of the laser point in the mixed reality space, and generating the trajectory record.

14. The mixed reality device as claimed in claim 7, further comprising:
   a power supply unit, disposed inside the body and connected to the control unit, wherein the power supply unit provides a working voltage.

15. An operation method of a mixed reality device, comprising:
- generating a trigger signal through a triggering unit of an indicator device;
- receiving a trigger signal using a control unit of the indicator device, and generating a first control signal;
- enabling a light source unit of the indicator device to generate a light source and controlling the light-emitting state of the light source according to the first control signal, wherein the indicator device comprises at least two positioning elements, and the light source unit and the at least two positioning elements are disposed on different axes, the at least two positioning elements comprise spheres or protrusions, and the positions of the light source unit and the at least two positioning elements do not form a straight line;
- projecting a virtual image to a mixed reality space comprising a real environment using a projecting module of a head-mounted device;
- photographing the indicator device using a photographing module of the head-mounted device, and generating an image;
- receiving the image using a processing unit of the head-mounted device, calculating the position of the light source unit of the indicator device in the mixed reality space according to the image of the light source unit and the at least two positioning elements or the at least two positioning elements, and recording the motion image of the light source unit of the indicator device in the mixed reality space according to the light-emitting state of the light source, so as to generate a trajectory record.

16. The operation method of the mixed reality device as claimed in claim 15, further comprising:
- receiving a prompt signal of the head-mounted device and transmitting the prompt signal to the control unit using a signal transceiver unit of the head-mounted device;
- receiving the prompt signal using the control unit, so as to generate a second control signal; and
- receiving a second control signal using a prompt unit of the indicator device, so as to provide a prompt message.

17. The operation method of the mixed reality device as claimed in claim 16, wherein the step of receiving the prompt signal of the head-mounted device and transmitting the prompt signal to the control unit using a signal transceiver unit of the head-mounted device further comprises:
- providing the prompt signal using the processing unit according to the trajectory record and a predetermined trajectory.

18. The operation method of the mixed reality device as claimed in claim 15, wherein the light-emitting state of the light source comprises emitting light, flashing light, emitting no light and change of color or brightness.

19. The operation method of the mixed reality device as claimed in claim 15, wherein the light source unit comprises a light emitting diode and/or a laser source.

* * * * *